March 20, 1934. I. C. GELLMAN 1,951,605
BREAD SLICING MACHINE AND TAKE-OFF THEREFOR
Filed June 19, 1933 4 Sheets-Sheet 2
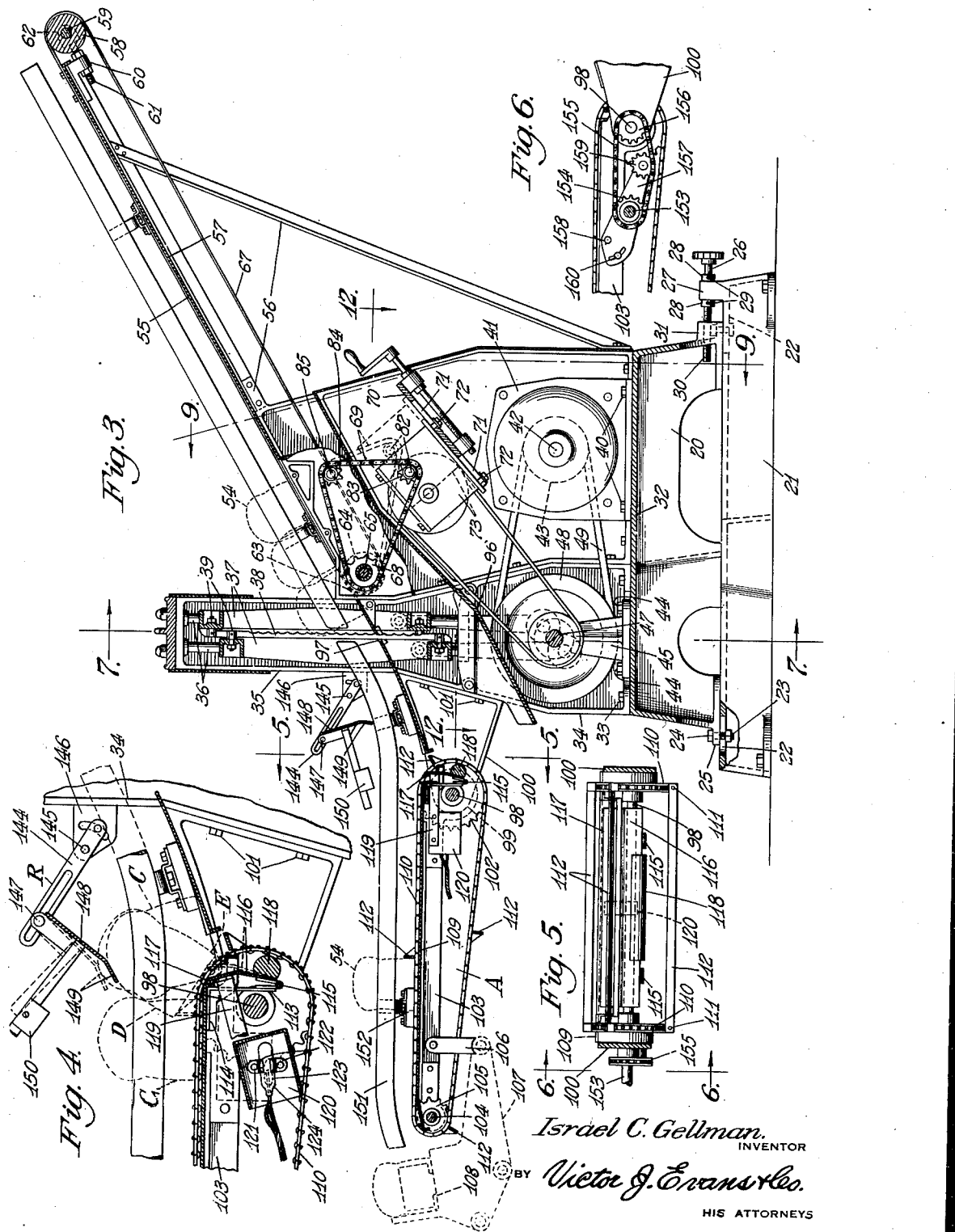
Israel C. Gellman.
INVENTOR
BY Victor J. Evans & Co.
HIS ATTORNEYS

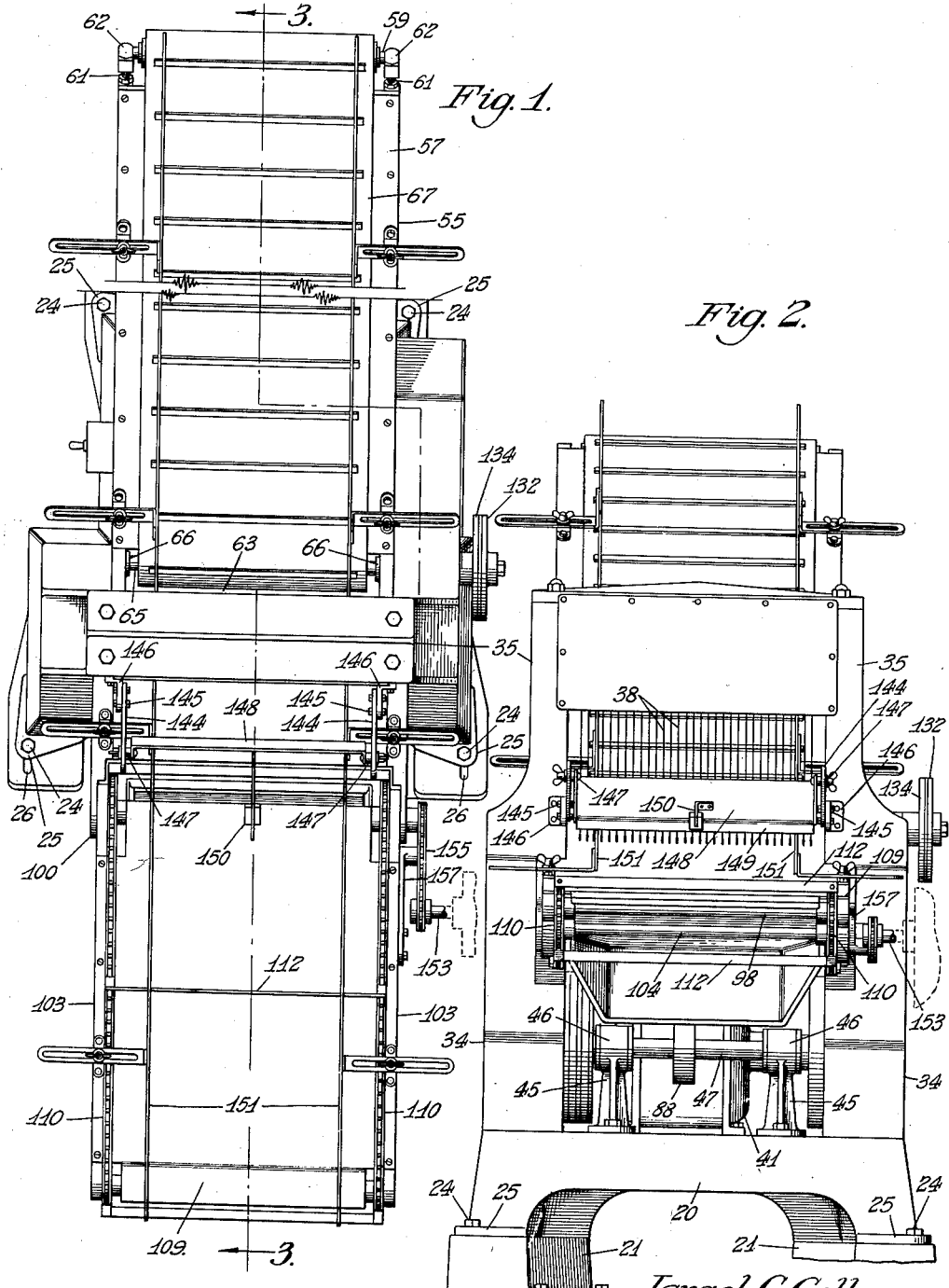

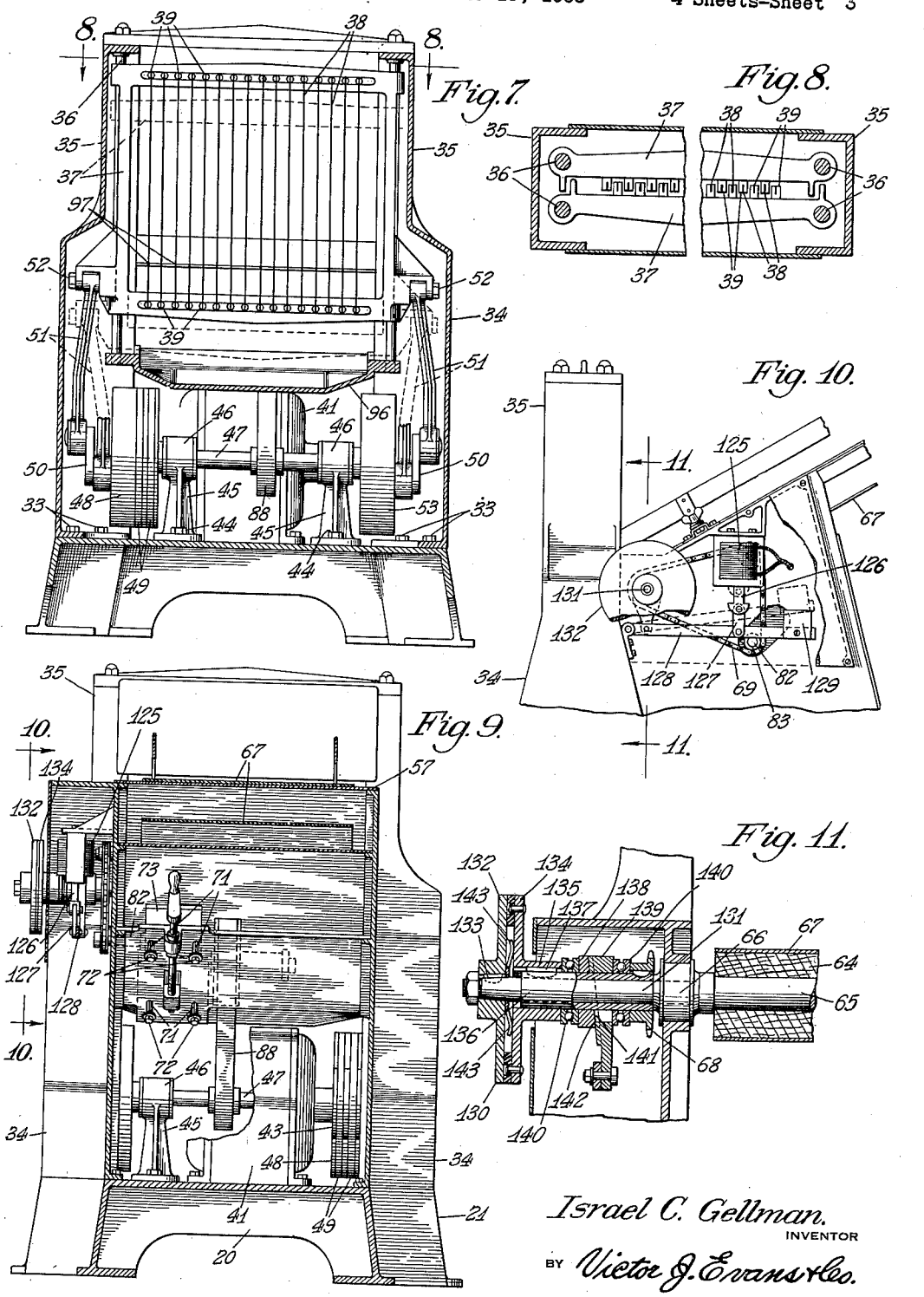

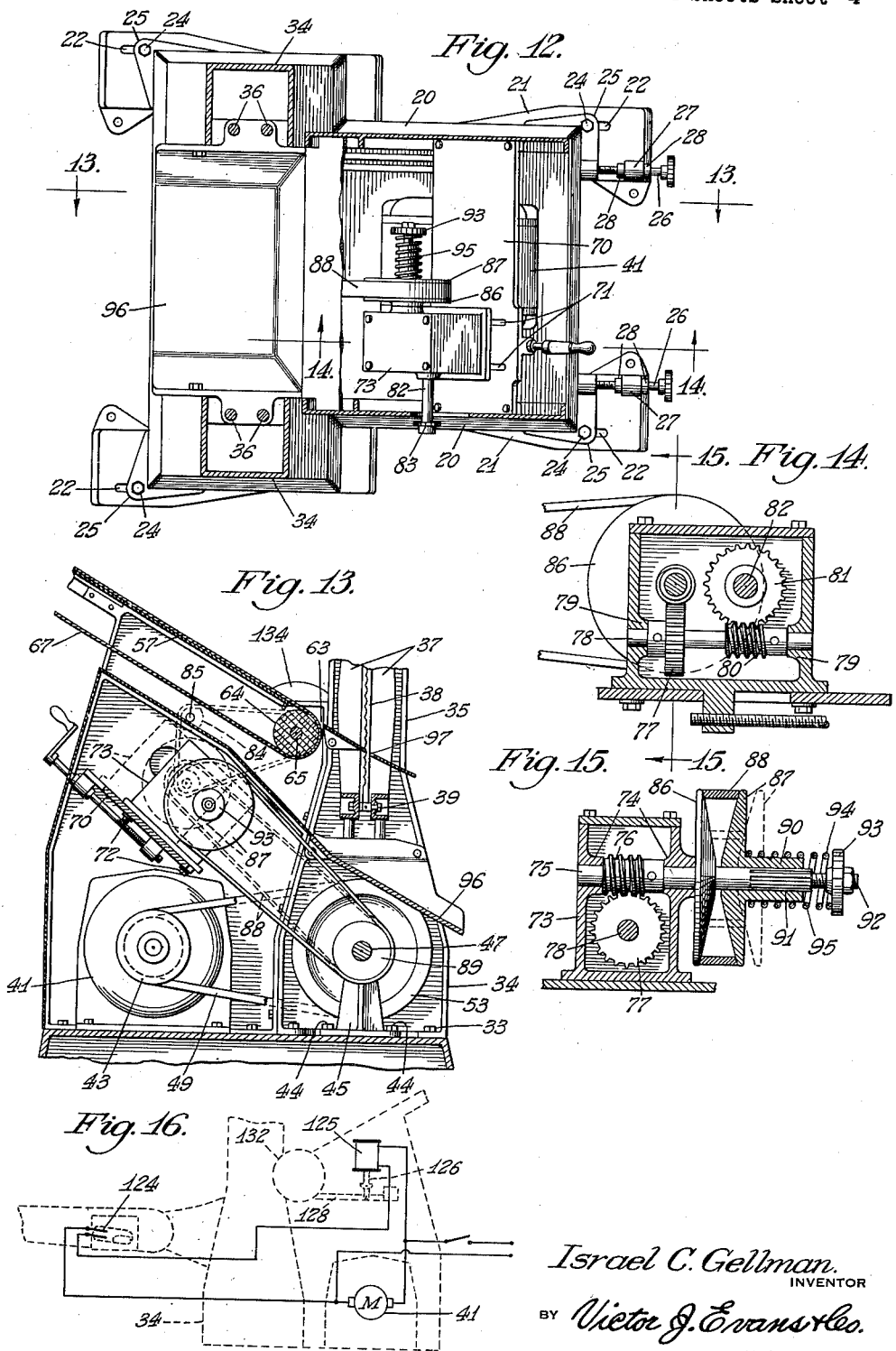

Patented Mar. 20, 1934

1,951,605

UNITED STATES PATENT OFFICE 1,951,605

BREAD SLICING MACHINE AND TAKE-OFF THEREFOR

Israel C. Gellman, Rock Island, Ill.

Application June 19, 1933, Serial No. 676,585

11 Claims. (Cl. 146—153)

This invention relates to certain novel improvements in bread slicing machines and take-offs therefor, and has for its principal object the provision of an improved construction of this character which will be highly efficient in use and economical in manufacture.

This invention has for one of its many objects the provision for slicing loaves of bread, conveying the sliced loaves of bread from the slicing machine to a conveyor of a wrapping machine, all of which is accomplished in successive steps.

A still further object of the invention is the provision of a machine of the character to be hereinafter more fully set forth for automatically delivering loaves of bread to a slicing machine and automatically conveyed therefrom to a conveyor of a wrapping machine, with the additional advantageous feature of preventing crushing or compressing of the loaves of bread after leaving the slicing machine and prior to conveyance by the conveyor to the wrapping machine conveyor.

A still further object of the invention is the provision of synchronizing the operation of a bread slicing machine with the operation of a conveyor which conveys the sliced loaves of bread from the slicing machine with the synchronizing mechanism and operable automatically by successive engagement with the sliced loaves of bread.

A still further object of the invention is the provision of mechanism for synchronizing the operation of a bread slicing machine and a take-off conveyor therefor, which mechanism being constructed and designed to prevent the stacking of sliced loaves of bread, thereby avoiding crushing or compression of the bread either after or before the same is passed through the slicing machine.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a plan view of the machine embodying the invention;

Fig. 2 is an elevational view of the feeding end of the machine illustrated in Fig. 1;

Fig. 3 is a sectional detail view of the same taken substantially on line 3—3 of Fig. 1;

Fig. 4 is a fragmentary sectional detail view showing a loaf in the act of passing on to the take-off conveyor.

Fig. 5 is a sectional detail view of the same taken substantially on line 5—5 of Fig. 3;

Fig. 6 is a sectional detail view of the same taken substantially on line 6—6 of Fig. 5;

Fig. 7 is a sectional detail view of the same taken substantially on line 7—7 of Fig. 3;

Fig. 8 is a sectional detail view of the same taken substantially on line 8—8 of Fig. 7;

Fig. 9 is a sectional detail view of the same taken substantially on line 9—9 of Fig. 3;

Fig. 10 is a sectional detail view of the same taken substantially on line 10—10 of Fig. 9;

Fig. 11 is a sectional detail view of the same taken substantially on line 11—11 of Fig. 10;

Fig. 12 is a sectional detail view of the same taken substantially on line 12—12 of Fig. 3;

Fig. 13 is a sectional detail view of the same taken substantially on line 13—13 of Fig. 12;

Fig. 14 is a sectional detail view of the same taken substantially on line 14—14 of Fig. 12;

Fig. 15 is a sectional detail view of the same taken substantially on line 15—15 of Fig. 14; and Fig. 16 is a diagrammatical view of a circuit arrangement embodied in the invention.

The bread slicing machine as illustrated in the drawings herein referred to is constructed and operates substantially the same as the bread slicing machine described and claimed in my pending application bearing Serial No. 548,244, filed in the United States Patent Office on or about the 1st day of July, 1931, except as hereinafter set forth.

In this connection the bread slicing machine embodied in the present invention includes a sub-base 20 which is mounted for longitudinal adjustment with reference to the machine upon a floor base 21 (Fig. 3). This longitudinal adjustment is accomplished by providing in the floor base 21 slots 22 through which operably project the shanks 23 of nut bearing bolts 24 carried by lateral ear portions 25 preferably formed as an integral part of the sub-base 20.

The manual adjustment of this base 20 is accomplished through the medium of a draw screw indicated at 26 (Fig. 3), there being preferably two sets of draw screws employed, one on each side of the machine at the feed end thereof. The draw screw is rotatably supported by an upstanding bearing 27 preferably formed as an integral part of the floor base 21, and this draw screw is prevented from longitudinal movement with reference to the bearing 27 by collars 28 secured to the screw by means of pin elements 29. The threaded shank end portion 30 of the screw operates in a threaded bore formed in a lateral boss 31 preferably formed as an integral part of the sub-base 20.

The arrangement is such, the purpose of which will be more fully set forth, that upon rotation of the draw screw the sub-base 20 is moved longitudinally of the floor base 21.

This sub-base 20 includes a top web 32 which supports certain mechanism of the bread slicing machine to be presently described.

Connected in any suitable manner, as, for example, by means of threaded bolts 33, to the sub-base 20 is a housing 34 which provides an enclosure for the slicing mechanism. The upper portion of this housing terminates into oppositely disposed channel shaped posts 35 (Figs. 7 and 12) within which are arranged guide rods 36 (Figs. 3 and 7). Slidably associated with these guide rods are rectangular shaped frames 37 arranged in facial abutting relation with respect to each other and adapted for reciprocation in opposed vertical directions.

These frames support a plurality of equally spaced apart blades 38, the blades of one frame operating between the blades of the other frame, as best shown in Fig. 8. The ends of these blades are connected to the frames through the medium of studs or pins 39 in a manner similar to that shown and described in my pending application hereinbefore referred to.

Arranged upon the web 32 and connected thereto by means of bolts 40 (Figs. 3 and 7) is a power driving means in the form of an electric motor 41 including an armature shaft 42 on which is mounted a driving pulley 43 (Fig. 13).

Connected to the web 32 by means of bolts 44 is a pair of aligned bearing brackets 45, and journaled in the bearings 46 thereof is a driven shaft 47. On one end of this shaft is fixed a pulley 48 operatively connected to the pulley 43 by a driving belt 49 (Figs. 3 and 13).

The ends of the shaft 47 provide offset cranks 50 to which are connected in any suitable manner connecting rods 51, in turn connected as at 52 to the frames 37, whereby upon rotation of the shaft 47 these frames 37 will be caused to reciprocate in opposing directions. On this shaft 47 there is also fixed in any suitable manner a flywheel or counter-balance 53.

The loaves of bread indicated at 54 are fed to and through the knives 38 by an inclined chute 55 supported by the housing as at 56. This inclined chute comprises a base plate 57, and at the upper end of the base plate there is rotatably supported a roller 58 mounted upon a shaft 59 adjustably supported by brackets 60 which are connected to the ends of the shaft 59 by nut-bearing arms 61 provided at their outer ends with suitable bearings 62 to receive the ends of the shaft 59.

Within the housing 34 adjacent the transverse slot 63 formed in the base plate 57 is a roller 64 mounted upon a shaft 65 having its end portions journaled in suitable bearings 66 provided by the housing 34. These rollers 58 and 64 support a continuous belt 67 upon which the loaves of bread 54 are placed for movement toward the knives 38 for passage therethrough during the cutting operation.

On the shaft 65 is mounted a sprocket gear 68 around which a continuous sprocket chain 69 operates.

Means is provided for controlling the speed of the belt 67, and this means preferably includes a supporting web 70 mounted within the housing either as a separate or as an integral part thereof. This web 70 is provided with aligned slots 71, and slidably mounted in these slots are head-bearing bolts 72 carried by a hollow block 73.

Supported in the bearings 74 (Fig. 15) provided by the block 73 is a shaft 75 on which is mounted a worm gear 76 operatively meshing with a gear 77 mounted on a shaft 78 journaled in suitable bearings 79 provided by the block 73 (Fig. 14). On this shaft 78 is fixedly secured a worm gear 80 operatively meshing with a gear 81 mounted on a shaft 82 journaled in suitable bearings provided by the block 73.

This shaft 82 exterior of the block 73 has mounted thereon a sprocket gear 83 (Fig. 3) having operative connection with the sprocket chain 69. This sprocket chain 69 passes over a sprocket gear 84 mounted on a shaft 85 journaled in suitable bearings provided by an adjacent wall of the housing 34.

Mounted on the shaft 75 is a conical shaped disc 86 mounted with the apex thereof opposite the apex of a similar conical shaped disc 87. This disc 87 together with the disc 86 provides a pulley for a continuous belt 88 which operates over a pulley 89 (Fig. 3) mounted on the shaft 47. The disc 87 provides a sleeve 90, and this sleeve 90 is slidably mounted upon the shaft 75 by means of a groove and rib structure 91. On the reduced portion 92 of the shaft 75 is fixedly secured an abutment washer 93 which bears against the end 94 (Fig. 15) of a spring 95, the opposite end of the spring 95 bearing against the disc 87.

The arrangement is such that when the distance between the longitudinal axes of the shafts 47 and 75 is increased, the tension applied to the belt 88 will operate to move the disc 87 outwardly against the action of the spring 95, thereby decreasing the radius of the travel of the belt between the discs 86 and 87 and consequently increasing the speed of the feed belt 55.

It is manifest that as the radius defining the line of travel of the belt along the pulley provided by the discs 86 and 87 increases, the speed of the speed belt 67 will decrease in proportion to the decrease of this radius. The speed of travel of the belt 67 may, therefore, be controlled so as to timely feed the loaves of bread to a position for gravitation through the knives for delivery to the take-off conveyor to be hereinafter described, thereby avoiding stacking, crushing or compression of the loaves of bread resulting from feeding the loaves of bread too fast to the knives for passage therethrough.

Secured within the housing 34 is an inclined crumb tray 96 arranged to receive crumbs passing through the slots 97 through which the knives operate.

The take-off conveyor is indicated at A (Figs. 1 and 3), and in this instance this take-off conveyor includes a shaft 98 journaled in suitable bearings 99 provided by a frame structure 100 connected to the housing 34 as at 101. On this shaft 98 is mounted a pair of sprocket gears 102. Supported from this frame 100 is a pair of parallelly spaced bars 103 in the outer ends of which are journaled a shaft 104 supporting a pair of sprocket gears 105.

The outer ends of these bars 103 are supported as at 106 from a frame section 107 of a bread loaf wrapping machine of any well known type, including a receiving trough 108 which receives the sliced loaves of bread from the take-off conveyor to be propelled to the wrapping mechanism of the wrapping machine in a manner which is well known in the art.

These bars 103 support a plate 109 upon which the loaves of bread 54 are received and conveyed to the receiving trough 108 in a manner to be now described.

The sprocket gears 102 and 105 have operative connection with continuous sprocket chains 110, and secured to these chains as at 111 are flights or pusher bars 112, which when operative serve to feed the sliced bread loaves upon the plate 109 to the receiving trough 108.

Mechanism is provided to control the operation of the slicing machine so as to prevent packing of the loaves of bread at the point of take-on on the take-off conveyor, and in the present instance this mechanism includes supporting brackets 113 supported from the plate 109 as at 114. Hingedly connected as at 115 to these brackets 113 is a trip plate 116, the upper longitudinal edge 117 of which is disposed in the path of the sliced bread loaves at the end of the chute of the bread slicing machine. This trip plate 116 is normally held in an outer hinged position with respect to the brackets by means of a counterweight or balance 118.

Carried by this plate 116 by means of an arm 119 is a housing 120. Mounted to one of the walls of this housing 120 as at 121 are clip elements 122 which support the tube 123 of a mercury switch 124 of a well known construction.

The operation is such that when a sliced bread loaf indicated at C is disposed with its forward longitudinal edge at the take-on point of the take-off conveyor, the adjacent flight or push bar will slightly tilt in an upward direction this loaf against the action of a retaining device indicated at R so as to position this loaf in the position indicated at D, with the flight or push bar in a position to travel away from the loaf while in this position, so that the next succeeding flight or push bar will engage the opposite lower longitudinal edge E of the loaf to set and convey the same over the surface of the plate 109. However, should another loaf of bread be fed toward the take-off conveyor before this load C is moved by the said succeeding flight or push bar, the belt conveyor of the slicing machine will be momentarily rendered inoperative to continue slicing operation on the succeeding loaves of bread. This momentary discontinuance of the operation of the belt conveyor of the slicing machine takes place in this manner.

When the loaf C comes into contact with the upper longitudinal edge of the trip plate 116, the forward movement to this loaf by succeeding loaves of bread will cause the trip plate 116 to pivot against the action of the counterweight or balance 118 and dispose the mercury switch in a position to complete a contact between the contact point of the switch so as to complete a circuit between a source of electric energy and the coil 125. When this coil 125 is energized, it will attract a solenoid 126, and this solenoid is connected through the medium of a link 127 to a lever 128. The operation of this solenoid will elevate the lever 128 against the action of a counter-weight 129 and disengage a clutch 130 which operatively connects the sprocket gear 68 with a shaft 131 on which the same is mounted.

This clutch includes a disc 132 fixed to the shaft 131 as at 133 and is adapted to have frictional connection with a driving disc 134 including a sleeve 135 slidably mounted on a sleeve 136 and fixed thereto for rotation therewith by means of a slot and key connection 137. This sleeve 136 is mounted upon the shaft 131, and fixed to this sleeve is the sprocket gear 68. The clutch elements are indicated at 138 and 139 and are disposed between thrust bearings 140.

The element 139 has a cam surface 141 which operates against a cam surface 142 whereby when the clutch element 139 is in the position shown in Fig. 11, the disc 134 will be forced into frictional contact with the disc 132 against the separating springs 143 whereby to complete an operative connection between the shaft 131 and the sprocket gear 68.

The retaining device hereinbefore referred to is best shown in Fig. 4 of the drawings, and this retaining device includes arms 144 adjustably supported as at 145 from brackets 146 provided by the housing 34. Pivotally connected to these arms 144 by means of a slot and pin connection 147 is a pressure plate 148 having a forward longitudinal edge portion 149 slightly angled upwardly. This pressure plate 148 is held in position for engagement with the loaves of bread by means of a counter-balance or weight 150. This retaining device co-operates with the flights or push bars to position the loaves of bread upon the take-off conveyor and to hold the sliced loaves in loaf form during the upward tilting thereof by action of the flights or push bars of the take-off conveyor, thereby preventing the sliced loaves from falling apart during movement thereof.

Associated with the take-off conveyor are side guide bars 151 which are adjustably mounted upon the supporting brackets 152 carried by the side bars 103.

A brief statement of the complete operation of the machine will best illustrate the advancement which my invention has made in the bakery machinery art. Loaves of bread to be sliced are mounted upon the belt 67, and when the machine is in operation, this belt will feed the loaves of bread successively to the slicing knives 38. During the slicing operation the loaves of bread will be fed beyond these knives by the pushing pressure of the succeeding loaves of bread resulting from the conveyance of the bread to the slicing knives by the conveying belt, and upon leaving the slicing knives the sliced loaves of bread will gravitate to the point of take-on on to the take-off conveyor.

The first loaf of bread leaving the slicing knives will be brought into contact with the trip plate 116 and forced thereagainst by the succeeding loaves of bread. This forward forcing causes the trip plate 117 to pivot in a direction to tip the mercury tube 123 to complete a circuit for the solenoid coil 125, whereupon by operation of the solenoid coil, the clutch illustrated in Fig. 11 will be momentarily thrown from operative position so as to momentarily stop the operation of the conveying belt. During this time a flight or push bar of the take-off conveyor will engage the forwardmost loaf of bread and tilt the same against the action of the retaining device so as to place the loaf of bread in position to be taken up by the next flight or push bar for travel over the surface of the plate 119 to the delivery end of the take-off conveyor to the receiving trough 108 of the wrapping machine.

As soon as this forwardmost loaf of bread is elevated to the position indicated at G, the trip plate 116 will pivot in an opposite direction to tilt the mercury switch so as to break the circuit to the solenoid coil 125 to render the clutch (illustrated in Fig. 11) again operative which again brings into operation the conveyor belt 67. This arrangement prevents crushing of the loaves of bread at a point between the take-off conveyor and the slicing knives and provides an effective timing arrangement for timing the operation of the slicing machine with the operation of the take-off conveyor.

The take-off conveyor is driven through a drive shaft 153 (Fig. 1) of the wrapping machine. On this drive shaft 153 is mounted a sprocket gear 154 (Fig. 6), and this sprocket gear is connected by means of a sprocket chain 155 to a sprocket gear 156 mounted on the shaft 98.

A tensioning device is provided for the sprocket chain 155, and this tensioning device includes an arm 157 adjustably mounted as at 158 to one of the bars 103. To the outer end of the arm 157 is mounted a sprocket gear 159 having operative engagement with the sprocket chain 155.

Through the bolt and slot connection 160 the arm 157 may be pivoted by its connection 158 to the bar 103 so as to properly position the sprocket gear 159 in proper position to exert the necessary tension on the sprocket chain 155.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An apparatus of the class described including in combination a slicing machine comprising movable slicing knives, means for feeding articles to the slicing knives, driving means for said feeding means including a clutch structure, means for operating said clutch structure, a chute adapted to receive the articles when sliced by said knives, and means disposed at the delivery end of the chute in the path of movement of the sliced articles and operable by contact with said articles for controlling operation of said clutch operating means.

2. An apparatus of the class described including in combination a slicing machine comprising movable slicing knives, means for feeding articles to the slicing knives, driving means for said feeding means including a clutch structure, means for operating said clutch structure, a chute adapted to receive the articles when sliced by said knives, means disposed at the delivery end of the chute in the path of movement of the sliced articles and operable by contact with said articles for controlling operation of said clutch operating means, and a conveyor structure disposed to receive the sliced articles from said chute.

3. An apparatus of the class described including in combination a slicing machine comprising movable slicing knives, means for feeding articles to the slicing knives, driving means for said feeding means including a clutch structure, electrically operated means for operating said clutch structure, a chute adapted to receive the articles when sliced by said knives, and means disposed at the delivery end of the chute in the path of movement of the sliced articles and operable by contact with said articles for controlling operation of said clutch operating means.

4. An apparatus of the class described including in combination a slicing machine comprising movable slicing knives, means for feeding articles to the slicing knives, driving means for said feeding means including a clutch structure, electrically operated means for operating said clutch structure, a chute adapted to receive the articles when sliced by said knives, means disposed at the delivery end of the chute in the path of movement of the sliced articles and operable by contact with said articles for controlling operation of clutch operating means, and a conveyor structure disposed to receive the sliced articles from said chute.

5. An apparatus of the class described including in combination a slicing machine comprising movable slicing knives and means for feeding articles to the slicing knives, driving means for said feeding means including an electrically operated clutch structure, a chute adapted to receive the articles when sliced by said knives, means disposed in the path of movement of and operable by contact with the sliced articles moving from the chute for controlling operation of said clutch structure, and a conveyor structure onto which the sliced articles from the chute are adapted to be moved including means for positioning the sliced articles in a plane for movement over said clutch control means onto the conveyor structure.

6. An apparatus of the class described including in combination a slicing machine comprising movable slicing knives, and means for feeding articles to the slicing knives, driving means for said feeding means including a clutch structure, means for operating the clutch structure, a chute adapted to receive the sliced articles from said knives, means disposed in the path of movement of and operable by contact with the sliced articles moving from the chute for controlling the said clutch operating means, and a conveyor structure onto which the sliced articles from the chute are adapted to be moved and including means for positioning the sliced articles in a plane for movement over said clutch control means onto the conveyor chute.

7. An apparatus of the class described including in combination a slicing machine comprising movable slicing knives, and means for feeding articles to the slicing knives, driving means for said feeding means including a clutch structure, means for operating the clutch structure, a chute adapted to receive the sliced articles from said knives, means disposed in the path of movement of and operable by contact with the sliced articles moving from the chute for controlling the said clutch operating means, a conveyor structure onto which the sliced articles from the chute are adapted to be moved and including means for positioning the sliced articles in a plane for movement over said clutch control means onto the conveyor chute, and means for regulating the operative speed of said feeding means.

8. An apparatus of the class described including in combination a slicing machine comprising movable slicing knives, means for feeding articles to the slicing knives, driving means for said feeding means including a clutch structure, means for regulating the operative speed of said feeding means, means for operating said clutch structure, a chute adapted to receive the articles when sliced by said knives, and means disposed at the delivery end of the chute in the path of movement of the sliced articles and operable by contact with said articles for controlling operation of said clutch operating means.

9. An apparatus of the class described including in combination a slicing machine comprising movable slicing knives, means for feeding articles to the slicing knives, driving means for said feeding means including a clutch structure, means for regulating the operative speed of said feeding means, means for operating said clutch structure, a chute adapted to receive the articles when sliced by said knives, means disposed at the delivery end of the chute in the path of movement of the sliced articles and operable by contact with said articles for controlling operation of said clutch operating means, and a conveyor structure disposed to receive the sliced articles from said chute.

10. An apparatus of the class described including in combination a slicing machine comprising movable slicing knives, means for feeding articles to the slicing knives, driving means for said feeding means including a clutch structure, means for regulating the operative speed of said feeding means, electrically operated means for operating said clutch structure, a chute adapted to receive the articles when sliced by said knives, and means disposed at the delivery end of the chute in the path of movement of the sliced articles and operable by contact with said articles for controlling operation of said clutch operating means.

11. An apparatus of the class described including in combination a slicing machine comprising movable slicing knives, means for feeding articles to the slicing knives, driving means for said feeding means including a clutch structure, means for operating said clutch structure, a chute adapted to receive the sliced articles from said knives, and means disposed at the delivery end of the chute in the path of movement of the sliced articles and operable by contact with said sliced articles for controlling operation of said clutch operating means, said clutch control operating means including a solenoid, a circuit breaker interposed in the circuit of said solenoid, and a pivotally supported plate supporting said circuit breaker and having one longitudinal edge disposed in position for said contact with the sliced articles.

ISRAEL C. GELLMAN.